(12) United States Patent
Hung

(10) Patent No.: US 8,837,881 B2
(45) Date of Patent: Sep. 16, 2014

(54) OPTICAL CONNECTOR HAVING HIGH COUPLING PRECISION

(71) Applicant: Hon Hai Precision Industry Co., Ltd., New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/869,216

(22) Filed: Apr. 24, 2013

(65) Prior Publication Data

US 2014/0185984 A1    Jul. 3, 2014

(30) Foreign Application Priority Data

Dec. 27, 2012  (TW) ............................. 101150713 A

(51) Int. Cl.
*G02B 6/32* (2006.01)
*G02B 6/42* (2006.01)

(52) U.S. Cl.
CPC .................................. *G02B 6/4206* (2013.01)
USPC ................... 385/33; 385/15; 385/39; 385/73; 385/74

(58) Field of Classification Search
USPC .................. 385/15, 31, 33, 39, 53, 55, 73, 74
See application file for complete search history.

(56) References Cited

U.S. PATENT DOCUMENTS 5,324,954 A * 6/1994 Oikawa ...................... 250/559.3
5,815,624 A * 9/1998 Rosenberg .................... 385/115
8,414,199 B2 * 4/2013 Ishigami ......................... 385/93

* cited by examiner

*Primary Examiner* — Jennifer Doan
(74) *Attorney, Agent, or Firm* — Novak Druce Connolly Bove + Quigg LLP

(57) ABSTRACT

An optical connector includes a jumper, optical fibers and an optical-electric coupling element. The jumper includes a lower surface and an upper surface. The jumper defines a first receiving hole and a second receiving hole. A flange perpendicularly extends upward from a periphery of the upper surface. The flange defines a locating opening. The optical-electric coupling element includes a bottom surface and a top surface. The bottom surface forms at least two first coupling lenses. The bottom surface defines a cutout spatially corresponds with the flange of the jumper. The cutout includes a bottom portion. A locating projector extends upward from the bottom portion. The locating projector is inserted into the locating opening to attach the jumper into the optical-electric coupling element, with each of the first coupling lens being received in the first receiving hole or the second receiving hole. The flange being received in the cutout.

12 Claims, 4 Drawing Sheets

OPTICAL CONNECTOR HAVING HIGH COUPLING PRECISION

BACKGROUND

1. Technical Field

The present disclosure relates to optical connectors, and particularly to an optical connector which has a high coupling precision.

2. Description of Related Art

An optical connector includes a laser diode for emitting optical signals, a first optical transmission assembly, a second optical transmission assembly coupled with the first optical transmission assembly, and a photo diode. The optical signals emitted from the laser diode can enter the first optical transmission assembly, be transmitted through the second optical transmission assembly to the photo diode, and finally be converted into electrical signals by the photo diode.

The first optical transmission assembly includes a plurality of coupling lenses and the second optical assembly includes a plurality of optical fibers for coupling the coupling lenses to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, it is difficult to consistently align the positioning holes and the positioning posts together, which may result in lowered coupling precision between the coupling lenses and the optical fibers, and thus poor optical signals transmittance.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
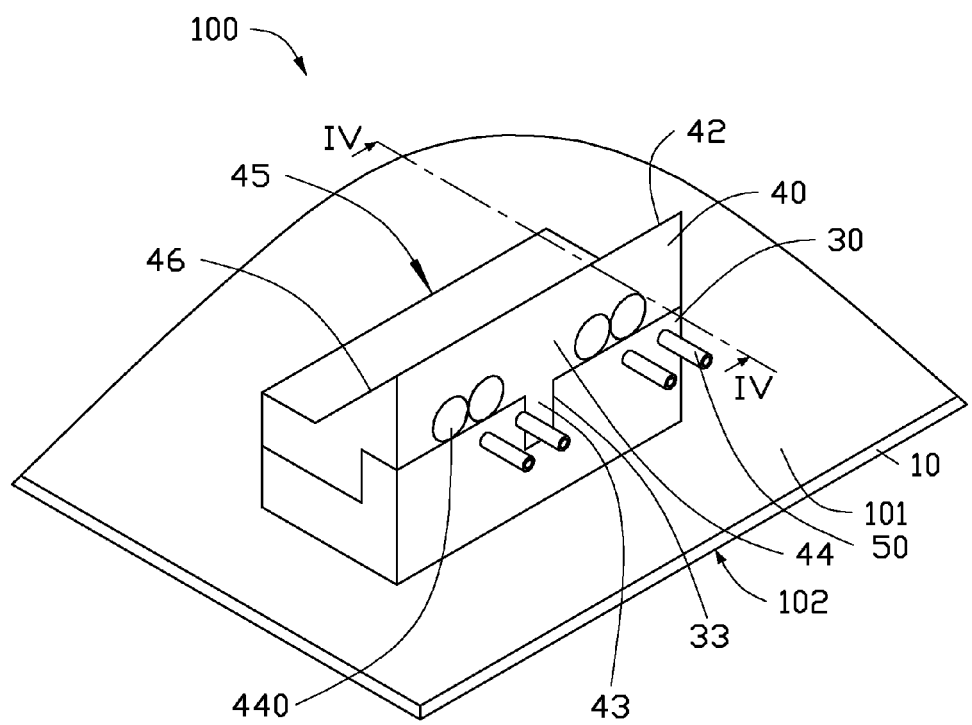
FIG. 1 is an assembled, isometric view of an optical connector, according to an exemplary embodiment.
Figure 2:
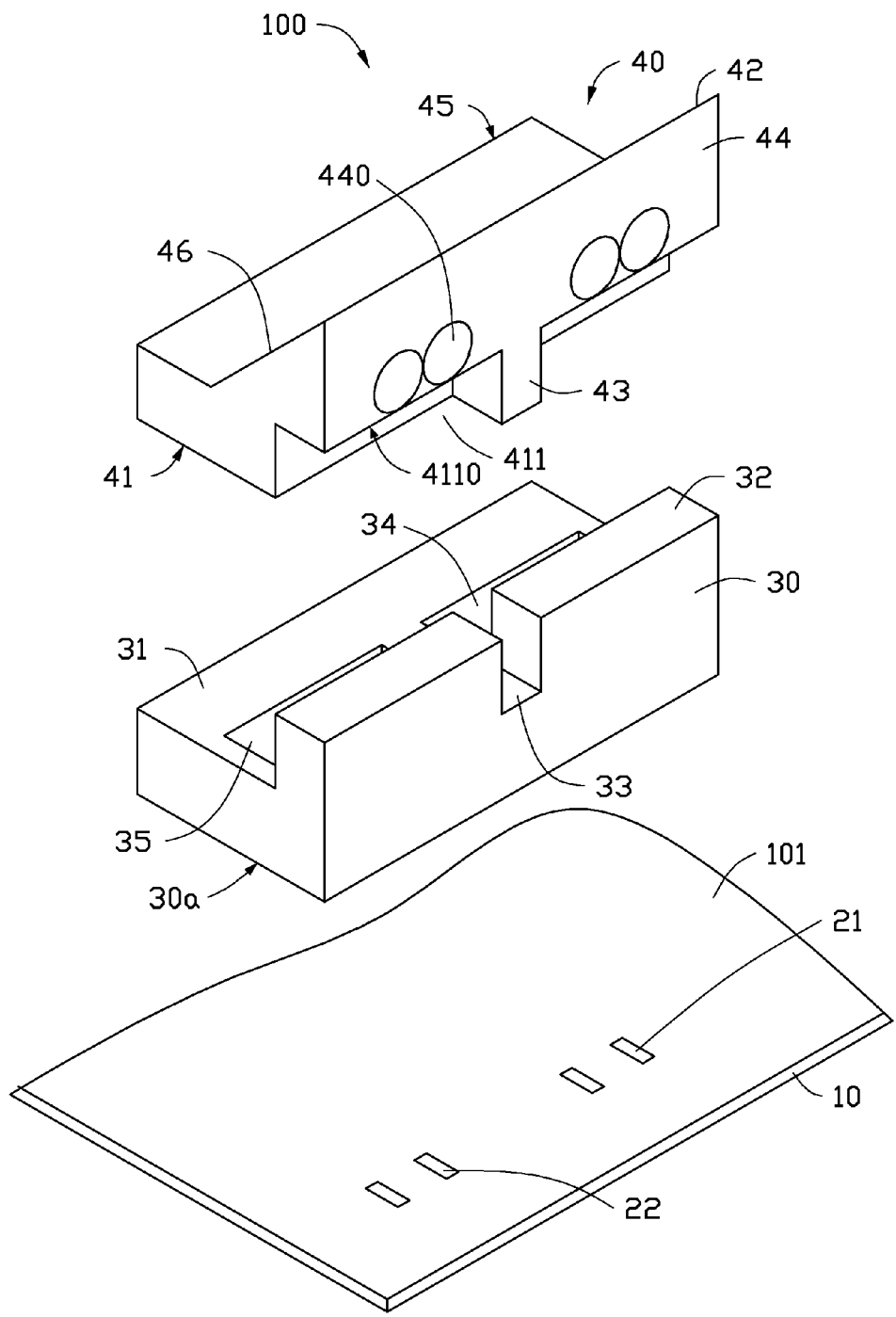
FIG. 2 is an exploded, isometric view of optical connector of FIG. 1.
Figure 3:
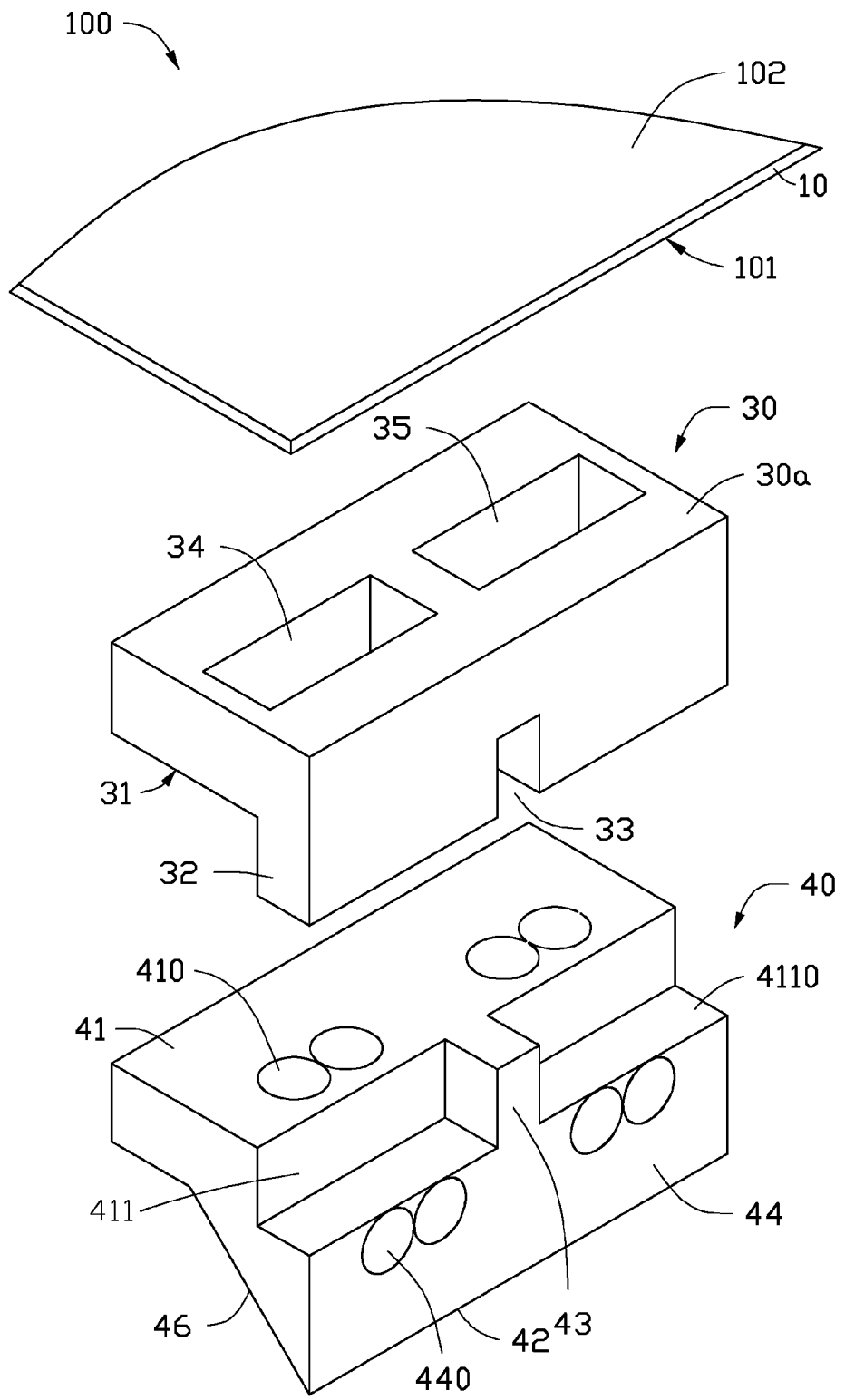
FIG. 3 is similar to FIG. 2, but viewed from another angle.
Figure 4:
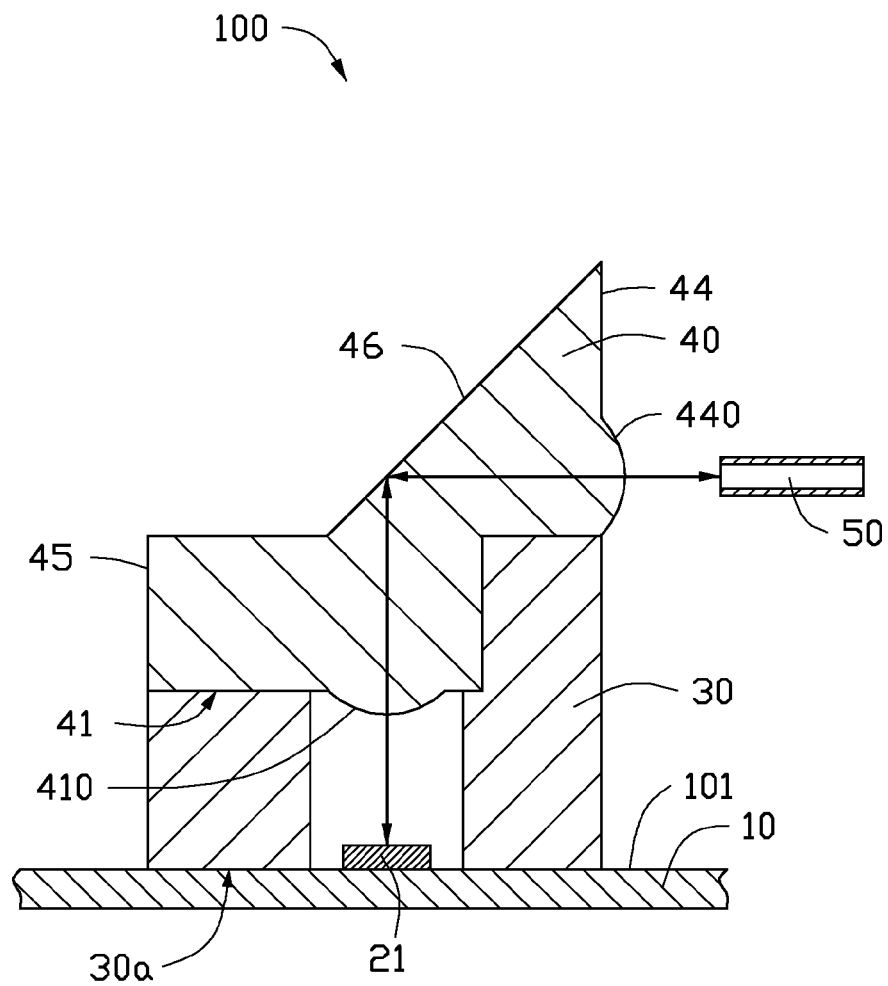
FIG. 4 is a cross-sectional view taken along line IV-IV of the optical connector of FIG. 1.

FIGS. 1-4 show an optical connector 100, according to an embodiment. The optical connector 100 includes a printed circuit board (PCB) 10, a jumper 30 positioned on the PCB 10, an optical-electric coupling element 40 detachably connected to the jumper 30, and four optical fibers 50.

The PCB 10 includes a supporting surface 101 and a rear surface 102 facing away from the supporting surface 101. Four photoelectric conversion chips, such as two laser diodes 21 and two photo diodes 22, are positioned on the supporting surface 101. The PCB 10 contains various circuits (not shown) that connect to the two laser diodes 21 and the two photo diodes 22, to drive the laser diodes 21 to emit light, and for the demodulation of data in the light received by the photo diodes 22.

The jumper 30 includes a lower surface 30a, an upper surface 31 facing away from the lower surface 30a. The upper surface 31 is substantially parallel with the lower surface 30a. The jumper 30 defines a first receiving hole 34 and a second receiving hole 35. Both the first receiving hole 34 and the second receiving hole 35 run through the upper surface 31 and the lower surface 30a. The lower surface 30a is positioned on the supporting surface 101 with the laser diodes 21 being receiving in the first receiving hole 34 and with the photo diodes 22 being receiving in the second receiving hole 35.

A flange 32 perpendicularly extends upward from a periphery of the upper surface 31. The flange 32 defines a locating opening 33 at a center thereof.

The optical-electric coupling element 40 includes a bottom surface 41 and a top surface 42 facing away from the bottom surface 41. Four first coupling lenses 410 are formed in the bottom surface 41. In the embodiment, all of the first coupling lenses 410 are convex lenses and are integrally formed with the optical-electric coupling element 40. The bottom surface 41 defines a cutout 411 spatially corresponding with the flange 32 of the jumper 30. The cutout 411 includes a bottom portion 4110. A locating projector 43 perpendicularly extends upward from the bottom portion 4110. The locating projector 43 spatially corresponds with the locating opening 33. The shape and the size of the locating projector 43 respectively correspond with the shape and the size of the locating opening 33. The shape and the size of the cutout 411 respectively correspond with the shape and the size of the flange 32. In the embodiment, both the locating projector 43 and the locating opening 33 are rectangular in shape. When in assembly, the locating projector 43 is inserted into the locating opening 33 as a pinch fit to firmly attach the jumper 30 into the optical-electric coupling element 40. Each of the first coupling lens 410 is received in the first receiving hole 34 or the second receiving hole 35. The flange 32 is received in the cutout 411. Each of the first coupling lens 410 aligns with one of the laser diodes 21 or one of the photo diodes 22.

The optical-electric coupling element 40 also includes a first external sidewall 44 and a second external sidewall 45 facing away from the first external sidewall 44. The first external sidewall 44 is substantially parallel with the second external sidewall 45. The bottom surface 41 perpendicularly connects to both the first external surface 44 and the second external surface 45. The optical-electric coupling element 40 defines a sloped surface 46 extending from the top surface 42 to the second external sidewall 45. The second external sidewall 45 and the sloped surface 46 define an angle therebetween. In the embodiment, the angle is about 45 degrees. An angle between an optical axis of each first coupling lens 410 and the sloped surface 46 is about 45 degrees.

The first external sidewall 44 forms four second coupling lenses 440. In the embodiment, all of the second coupling lenses 440 are convex lenses and are integrally formed with the optical-electric coupling element 40. An included angle between an optical axis of each second coupling lens 440 and the sloped surface 46 is therefore about 45 degrees. Each of the second coupling lenses 440 optically aligns with one of the first coupling lenses 410 via the sloped surface 46.

The optical fibers 50 are positioned above and substantially parallel with the PCB 10. Each of the optical fibers 50 is aligned with a second coupling lenses 440.

In use, light emitted from the two laser diodes 21 is directed into the optical-electric coupling element 40 by two of the first coupling lenses 410, then the light path is bent about 90 degrees by the sloped surface 46. In the embodiment, the second coupling lenses 440 are positioned on the light path reflected by the sloped surface 46 from the laser diodes 21. As such, the light is reflected into the two of the second coupling lenses 440 and finally into two of the optical fibers 50 by the second coupling lenses 440. A process of the photo diodes 22 receiving light is the reversed process of the laser diodes 21 emitting light.

In other embodiments, the numbers of the laser diodes 21, the photo diodes 22, the first coupling lenses 410, the second coupling lenses 440 and the optical fibers 50 can be changed depending on need.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
a jumper defining a first receiving hole and a second receiving hole, the jumper comprising a flange perpendicularly extending upward from a periphery of the upper surface, the flange defining a locating opening;
an optical-electric coupling element comprising a bottom surface and a top surface facing away from the bottom surface, the bottom surface forming at least two first coupling lenses, the bottom surface defining a cutout spatially corresponding with the flange of the jumper, the cutout comprising a bottom portion, the optical-electric coupling element comprising a locating projector extending upward from the bottom portion, the locating projector spatially corresponding with the locating opening and inserted into the locating opening to firmly attach the jumper into the optical-electric coupling element, each of the first coupling lens being received in the first receiving hole or the second receiving hole, and the flange being received in the cutout.

2. The optical connector of claim 1, wherein the optical-electric coupling element further comprises a first external sidewall and a second external sidewall facing away from the first external sidewall, the optical-electric coupling element defines a sloped surface extending from the top surface to the second external sidewall, at least two second coupling lenses are formed on the first external sidewall, and each of the second coupling lens optically aligns with a respective one of the first coupling lenses via the sloped surface.

3. The optical connector of claim 2, wherein the second external sidewall and the sloped surface define an angle therebetween, the angle is about 45 degrees.

4. The optical connector of claim 3, wherein an angle between an optical axis of each first coupling lens and the sloped surface is about 45 degrees.

5. The optical connector of claim 3, wherein an angle between an optical axis of each second coupling lens and the sloped surface is about 45 degrees.

6. The optical connector of claim 2, further comprising at least two optical fibers, wherein each of the at least two optical fibers align with a respective second coupling lens.

7. The optical connector of claim 2, wherein all of the first and second coupling lenses are convex lenses and are integrally formed with the optical-electric coupling element.

8. The optical connector of claim 1, further comprising a printed circuit board (PCB), wherein the PCB comprises a supporting surface and a rear surface facing away from the supporting surface, at least two laser diodes and at least two photo diodes are positioned on the supporting surface, the jumper comprises a lower surface and an upper surface facing away from the lower surface, both the first receiving hole and the second receiving hole run through the upper surface and the lower surface, the lower surface is positioned on the supporting surface with the laser diodes received in the first receiving hole and the photo diodes received in the second receiving hole.

9. The optical connector of claim 1, wherein the shape and the size of the locating projector correspond with the shape and the size of the locating opening.

10. The optical connector of claim 9, wherein both the locating projector and the locating opening are rectangular in shape.

11. The optical connector of claim 1, wherein the shape and the size of the cutout correspond with the shape and the size of the flange.

12. The optical connector of claim 1, wherein the locating projector is inserted into the locating opening as a pinch fit.

* * * * *